(No Model.)
W. A. SHANK.
JOURNAL CAP.
No. 442,786. Patented Dec. 16, 1890.
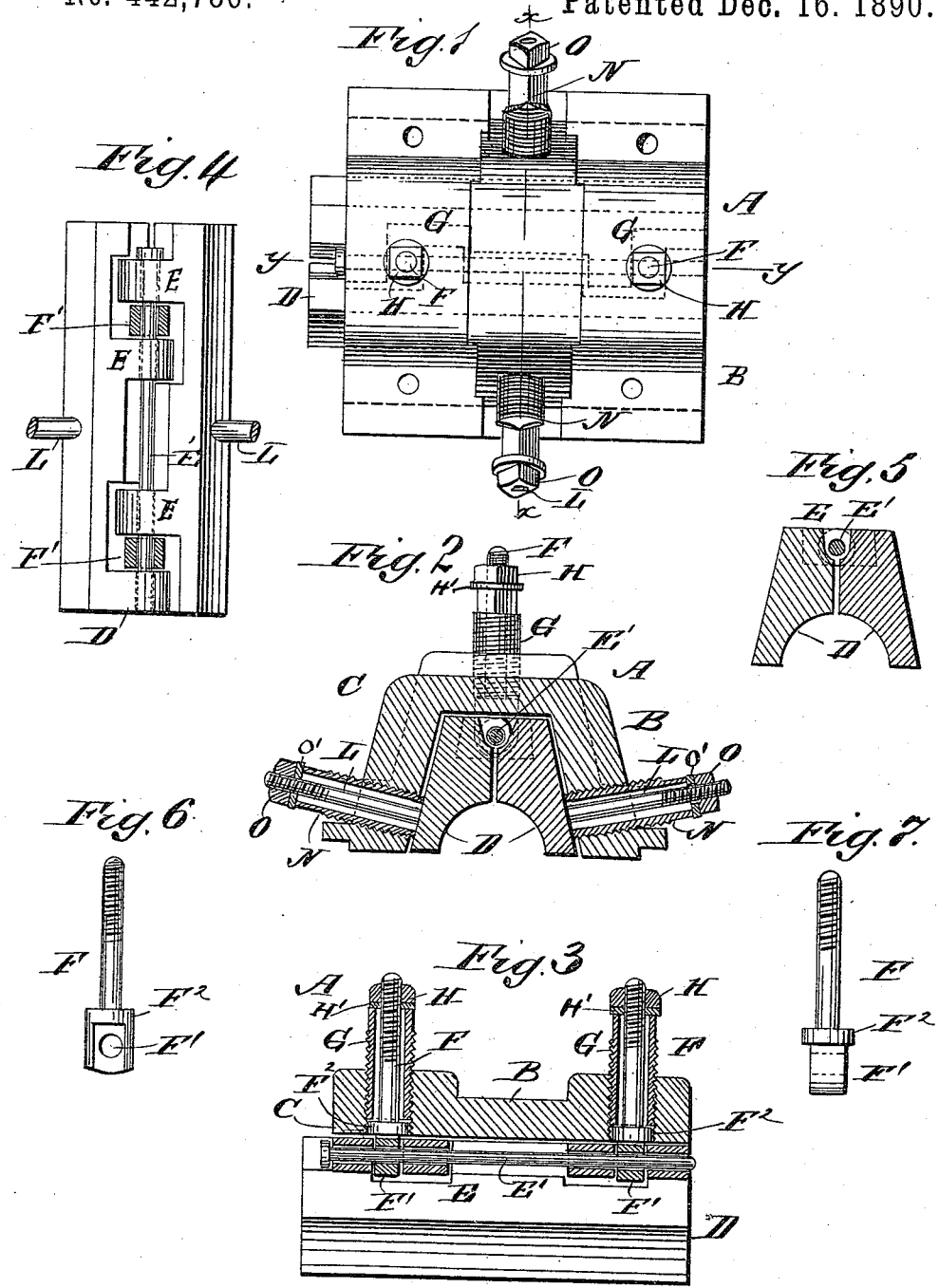
WITNESSES:
INVENTOR:
W. A. Shank
BY
ATTORNEYS

UNITED STATES PATENT OFFICE.

WILLARD A. SHANK, OF AMOSKEAG, GEORGIA.

JOURNAL-CAP.

SPECIFICATION forming part of Letters Patent No. 442,786, dated December 16, 1890.

Application filed June 17, 1890. Serial No. 355,739. (No model.)

*To all whom it may concern:*

Be it known that I, WILLARD A. SHANK, of Amoskeag, in the county of Dodge and State of Georgia, have invented a new and Improved Journal-Cap, of which the following is a full, clear, and exact description.

The object of the invention is to provide a new and improved cap specially designed for use on bearings for wood-working and other machinery, and which is simple and durable in construction and can be readily and accurately adjusted to take up all wear.

The invention consists of bearing-plates connected with each other by a hinge and held vertically adjustable in the cap-casing.

The invention also consists in certain parts and details and combinations of the same, as will be described hereinafter, and then pointed out in the claims.

Reference is to be had to the accompanying drawings, forming a part of this specification, in which similar letters of reference indicate corresponding parts in all the figures.

Figure 1 is a plan view of the improvement. Fig. 2 is a transverse section of the same on the line $x$ $x$ of Fig. 1. Fig. 3 is a longitudinal section of the same on the line $y$ $y$ of Fig. 1. Fig. 4 is a plan view of the bearing-plates or boxes. Fig. 5 is a transverse section of the same, and Figs. 6 and 7 are elevations of the bolts for supporting the pintle of the hinge.

The improved journal-cap A is provided with a casing B, adapted to be secured on top of the base of the bearing in the usual manner. On the inside of the casing B is formed a longitudinally-extending recess C, preferably of the form shown in Fig. 2, and in which are held two bearing plates or boxes D, each formed with a segmental recess at the under side, so that the two together form a semicircular recess to engage the top of the spindle passing through the bearing.

The two plates D are connected with each other on top by a hinge E, formed in any suitable manner and having its pintle E' passed through eyes F', formed in the lower ends of screw-bolts F, extending upward through hollow screws G, screwing in the top of the casing B. (See Fig. 3.) The outer threaded ends of the bolts F are engaged by nuts H, screwing against washers H', held on the outer ends of the hollow screws G.

Each of the bolts F is provided directly above the eye F' with a collar F², adapted to abut against the under side of the hollow screws G. By screwing the hollow screws G up or down in the casing B the pintle E' of the hinge E is raised or lowered, so that the bearing-plates D move correspondingly up or down inside of the longitudinal recess C of the casing B.

From the side of each bearing-plate D extends outward an arm L, passing through a hollow screw N, screwing in the side of the casing B. On the outer threaded end of the arm L screws a nut O against a washer O', resting on the outer end of the screw N. The outer end of the screw N is adapted to abut against the side of the respective bearing-plate D, so that the latter can be securely held in place on the inner end of the said screw N by screwing up the nut O on the threaded arm L.

When the cap is first used, the bearing-plates D are about in the position shown in Fig. 2, and when the bearing-plates have worn on their inner recessed surfaces then the operator turns the screws G, so as to move the plates D downward, and at the same time adjust the screws N to move the latter inward, whereby all slack or wear is taken up and the bearing-plates are securely held in place by adjusting the respective nuts H and O.

In order to conveniently turn the hollow screws G and N, they are provided near their outer ends with squared offsets for conveniently a wrench or other suitable tool. The screws N are made sufficiently large so that their inside diameter permits the threaded arms L to move downward when the plates are adjusted by the screws G without the said arms touching the insides of the screws N. The plates D can thus be adjusted from time to time to take up all wear until the plates are nearly all worn out.

The journal-cap is more specially designed for use on bearings of spindles which carry matcher-heads on planers; but it is also equally well adapted for other machines.

Having thus described my invention, what

I claim as new, and desire to secure by Letters Patent, is—

1. A journal-cap provided with bearing-plates connected together by a hinge the pintle of which is vertically adjustable, substantially as and for the purpose set forth.

2. In a journal-cap, the combination, with a casing, of bearing-plates within the casing and connected together by a hinge, and an adjusting device connected with the pintle of the hinge for adjusting the same vertically, substantially as described.

3. In a journal-cap, the combination, with a casing, of bearing-plates connected with each other by a hinge and arranged in the said casing, and screws screwing in the said casing against the sides of the said bearing-plates, substantially as shown and described.

4. In a journal-cap, the combination, with a casing, of bearing-plates connected with each other by a hinge and arranged in the said casing, screws screwing in the said casing against the sides of the said bearing-plates, and means, substantially as described, for raising and lowering the said plates in the said cap, as set forth.

5. In a journal-cap, the combination, with a casing having a longitudinally-extending recess, of bearing-plates fitted in the said recess and connected with each other on top by a hinge, eyebolts supporting the pintle of the said hinge, and hollow screws screwing in the said casing and supporting the said eyebolts, substantially as shown and described.

6. In a journal-cap, the combination, with a casing having a longitudinally-extending recess, of bearing-plates fitted in the said recess and connected with each other on top by a hinge, eyebolts supporting the pintle of the said hinge, hollow screws screwing in the said casing and supporting the said eyebolts, and hollow screws screwing in the sides of the said casing against the sides of the said bearing-plates, substantially as shown and described.

7. In a journal-cap, the combination, with a casing having a longitudinally-extending recess, of bearing-plates fitted in the said recess and connected with each other on top by a hinge, eyebolts supporting the pintle of the said hinge, hollow screws screwing in the said casing and supporting the said eyebolts, hollow screws screwing in the sides of the said casing against the sides of the said bearing-plates, and threaded arms secured on the sides of the said bearing-plates and passing through the second-named hollow screws to be secured thereon, substantially as shown and described.

WILLARD A. SHANK.

Witnesses:
J. T. COLCORD,
E. N. WOOD.